W. PHILLIPS.
FLUID PRESSURE BRAKE.
APPLICATION FILED AUG. 5, 1905.
991,538.
Patented May 9, 1911.
3 SHEETS—SHEET 1.
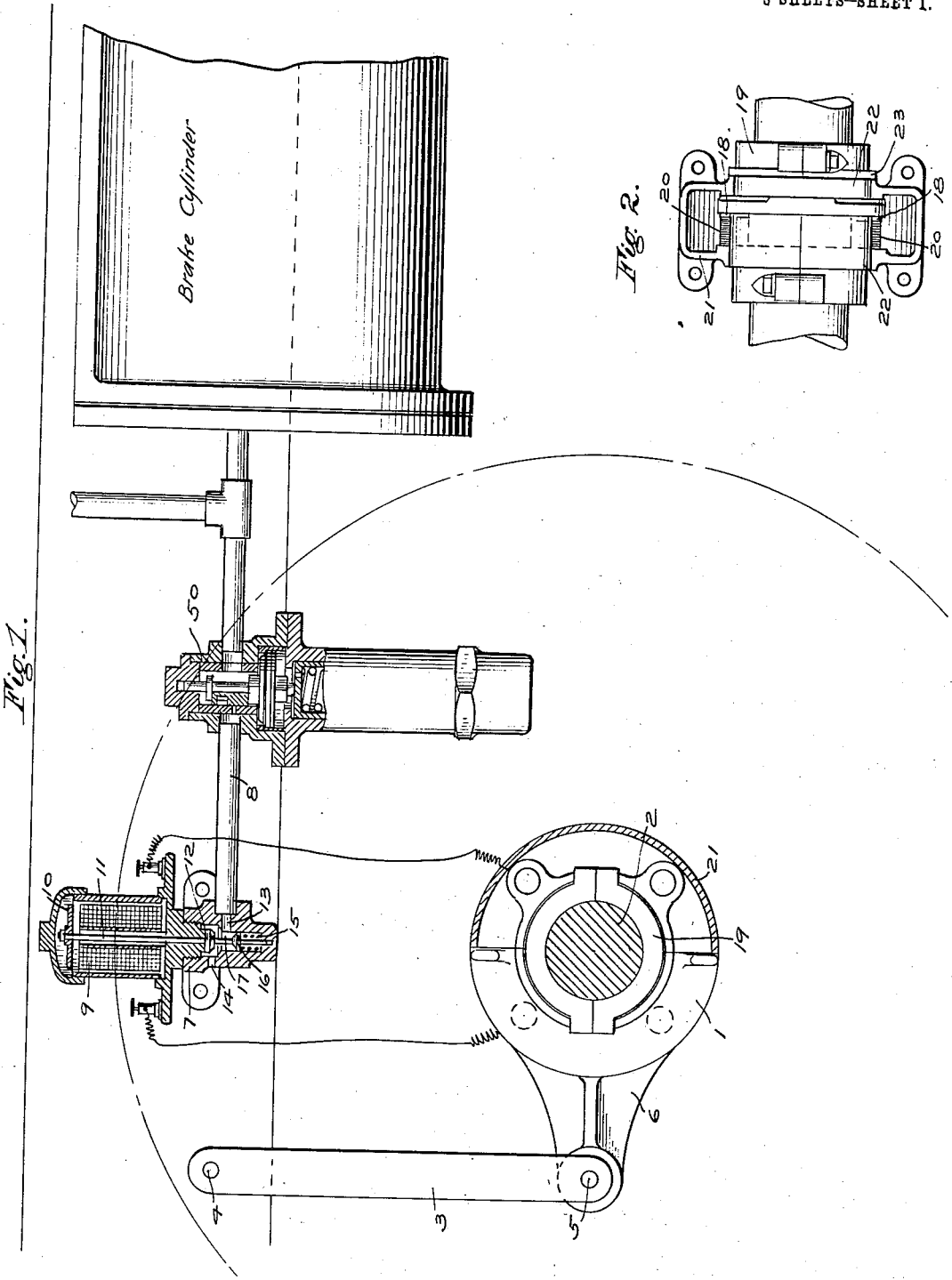
WITNESSES
INVENTOR
Walter Phillips
by E. Wright
Att'y.

W. PHILLIPS.
FLUID PRESSURE BRAKE.
APPLICATION FILED AUG. 5, 1905.
991,538.
Patented May 9, 1911.
3 SHEETS—SHEET 2.
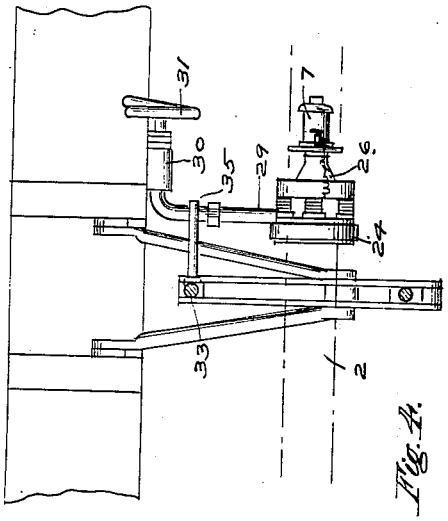
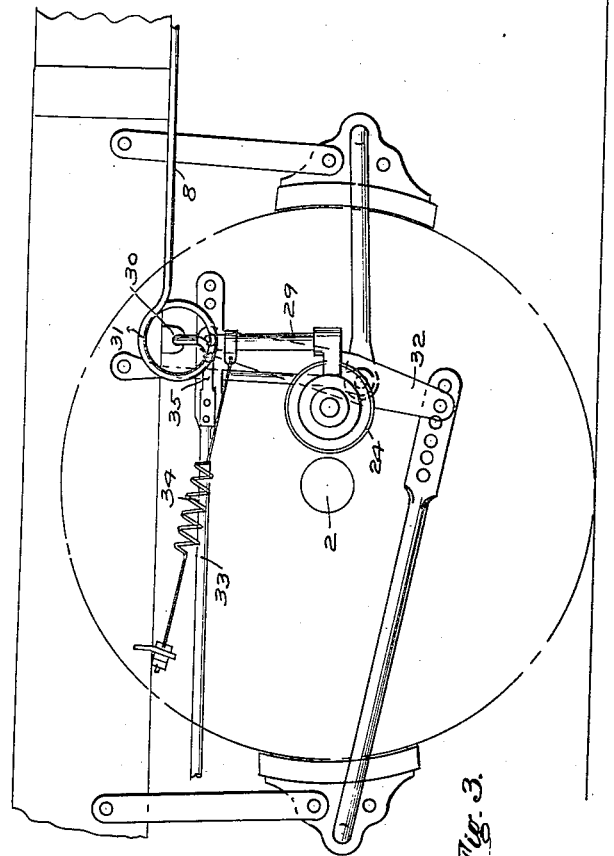
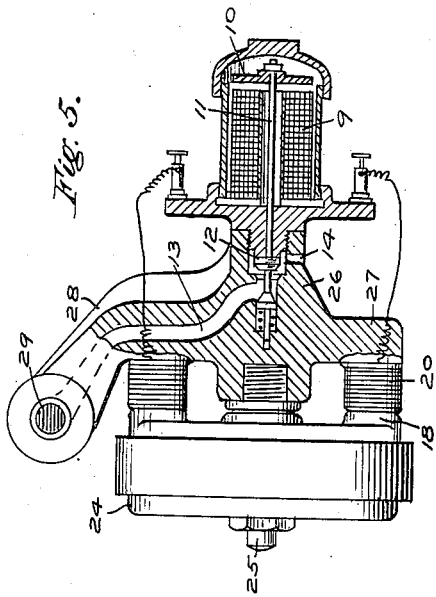
WITNESSES
INVENTOR
Walter Phillips
by E. Wright
Att'y.

W. PHILLIPS.
FLUID PRESSURE BRAKE.
APPLICATION FILED AUG. 5, 1905.

991,538.

Patented May 9, 1911.

3 SHEETS—SHEET 3.

WITNESSES

INVENTOR
Walter Phillips

Att'y.

UNITED STATES PATENT OFFICE.

WALTER PHILLIPS, OF LONDON, ENGLAND, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

991,538.  Specification of Letters Patent.  Patented May 9, 1911.

Application filed August 5, 1905. Serial No. 272,909.

*To all whom it may concern:*

Be it known that I, WALTER PHILLIPS, a citizen of the United States, residing in London, England, have invented a certain new and useful Improvement in Fluid-Pressure Brakes, of which the following is a specification.

This invention relates to fluid pressure brakes and has for its object to provide improved means whereby the pressure in the brake cylinder can be automatically regulated in proportion to the speed of the train.

According to this invention I generate, by means of a dynamo driven from one of the axles of the car, an electric current which will vary in accordance with the number of revolutions per minute of the axle. This variation of current I utilize to control a release valve whereby the pressure in the brake cylinder when the brakes are applied may be gradually diminished in proportion to the reduction in speed of the train.

The invention is illustrated in the accompanying drawings, in which—

Figure 6:
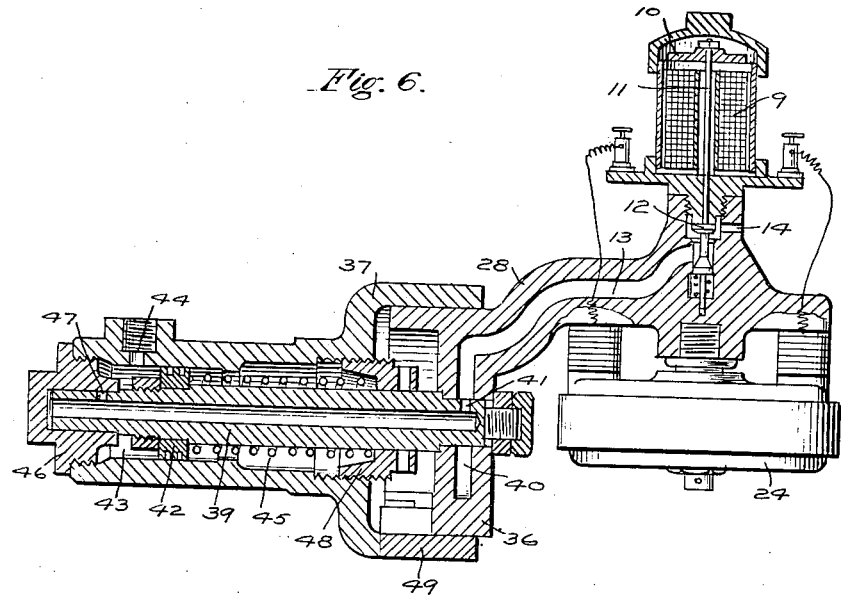
Figure 7:
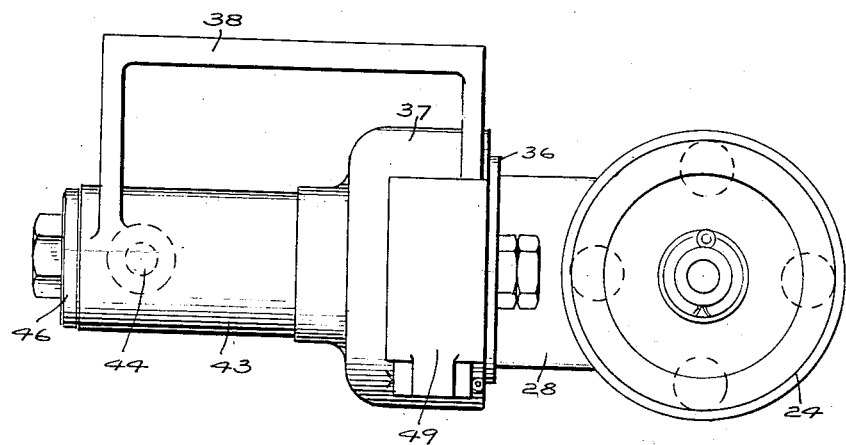

Figure 1 is a diagrammatic view showing a brake cylinder release valve controlled by a current generated by a dynamo driven from the axle of the vehicle, the valve being indicated in section; Fig. 2 is a side elevation of the dynamo with one half of the casing removed; Figs. 3 and 4 are respectively a front elevation and side elevation of a modified arrangement for driving the dynamo; Fig. 5 is a plan to an enlarged scale, and partly in section, of the dynamo, release valve and controlling magnet shown in Figs. 3 and 4; Figs. 6 and 7 are respectively a sectional plan and side elevation of another arrangement for driving the dynamo.

Referring to Fig. 1, the electric generator or dynamo is shown at 1, the rotor being keyed or otherwise secured upon the axle 2, shown in dotted lines, of the vehicle, the stator being freely mounted on the rotor or the axle of the vehicle and prevented from turning by a link 3 pivoted at one end 4 to the frame of the vehicle and at the other end 5 to an extending arm 6 of the stator. The release valve 7 is shown bolted to the frame of the vehicle, and the pipe connection to the brake cylinder is shown at 8.

In order to control the release valve 7, I include in the circuit of the dynamo an electromagnet or solenoid, to the armature or movable core of which, as the case may be, a valve is attached controlling communication between the brake cylinder and the atmosphere.

According to the construction shown in Fig. 1, the release valve is controlled by an electromagnet 9. The armature 10 of the electromagnet is provided with a stem 11 terminating in a valve 12 which controls communication between a port 13 leading from the brake cylinder and a port 14 leading to the atmosphere. The valve 12 is normally held in the open position by a spring 15 abutting at one end against the valve casing and at the other end against a shoulder 16 formed on an extension 17 of the armature stem 11. With this arrangement the varying force of the magnetic attraction due to the variation in the current generated by the dynamo will tend to close the valve 12 against the pressure in the brake cylinder and that of the spring 15.

This device is applicable to the auxiliary brake cylinders of a type of brake apparatus now frequently employed for high speed train service comprising a main and an auxiliary brake set. It may also be employed in connection with a single brake cylinder equipment, and a pressure regulated valve 50 may be inserted in the brake cylinder pipe 8 for holding the outlet closed when the brake cylinder pressure is less than a predetermined amount, the electrically controlled valve device being designed to hold the outlet closed at and above a predetermined rate of speed, but to open same at a lower rate of speed.

Any suitable type of dynamo may be utilized, but in some cases I employ a form of dynamo comprising a star-shaped permanent magnet consisting of a suitable number of alternating north and south poles which are so arranged as to revolve in front of soft iron cores each provided with a suitable number of turns of insulated copper magnet wire. When the poles are keyed on an axle of the car the soft iron cores may be mounted on the frame of the car or truck, for instance in a suitable slide, a running connection being provided between the rotor and the stator so that a certain air gap will be maintained and the permanent magnet will be prevented from striking the cores when any side movement of the car or truck takes place. In order to avoid any vertical movement of the rotor with respect to the stator, or vice versa, I prefer when the poles are mounted upon the axle of the vehicle to employ the arrangement shown in Figs. 1 and 2.

The alternating north and south pole pieces 18 are provided on a steel casting 19 divided in halves, which are bolted together over the axle 2. The soft iron cores 20 are secured to an outer dust-proof casing 21, also in halves and bolted together. The outer casing 21 is bored to fit over turned shoulders 22 on the casing 19 collars 23 being provided to prevent any longitudinal movement of the casing 21. One half of the outer casing 21 is provided with a projecting arm 6 to which is pivoted a link 3 secured to the frame of the vehicle as already described with reference to Fig. 1.

In order to prevent the dynamo from rotating when the brakes are not applied, I may employ the arrangement shown in Figs. 3, 4 and 5. A permanent magnet consisting of a suitable number of alternating north and south poles 18 is formed on or secured to a pulley 24 rotating on a pin 25 secured in the valve casing 26 and in front of stationary soft iron cores 20 provided on a flange 27 on the valve casing. The construction of the release valve 12 and the arrangement of the controlling electromagnet 9 is the same as that described with reference to Fig. 2, the port leading from the brake cylinder being shown at 13 and the port leading to the atmosphere at 14. The valve casing 26 is provided with a supporting arm 28 through which the port 13 leading from the brake cylinder is arranged. The device is supported by a pipe 29, one end of whch is screwed into the projecting arm 28 and the other end carried in a bearing 30 bolted to the frame of the vehicle. A flexible connection is provided between the pipe 29 and the pipe 8 leading to the brake cylinder by means of a length of coil piping 31. The brake lever 32 is worked by a rod 33 connected in the usual way to the piston and brake cylinder, and when the brakes are not applied the pulley 24 is withheld from contact with the axle 2 of the vehicle against the tension of a spring 34 by a hooked bar 35 which is fixed to the rod 33 and is bent partly around the pipe 29. When the brakes are applied the movement of the rod 33 releases the pipe 29 and the pulley 24 is then held in contact with the axle 2 by the spring 34. The same object may be achieved while at the same time permitting a certain predetermined pressure being retained in the brake cylinder under the control of the driver during all service applications of the brakes by means of the arrangements shown in Figs. 6 and 7. The arrangement of the release valve 12 controlling electromagnet 9 and dynamo is the same as that already described with reference to Fig. 5.

The supporting arm 28 is carried by a piston 36 sliding in a cylinder 37 carried by a bracket 38 bolted to the frame of the vehicle or truck, suitable means being provided for preventing the piston from turning. The piston 36 is provided with a hollow piston stem 39 between which and the port 13 communication is provided by means of a cavity 40 in the piston 36 and a port 41 in the piston stem. A second piston 42 sliding in a cylinder 43 is secured on the piston stem 39 and subjected on one side to brake cylinder pressure through a port 44 connected by a pipe to the brake cylinder and on the other side to the pressure of a spring 45 by which latter means the driving pulley 24 of the dynamo is normally held out of contact with the axle of the vehicle. The cylinder 43 is closed by a screwed plug 46 in which the end of the piston stem 39 slides. A port 47 is provided through the piston stem at such a point as to be covered by the end of the screwed plug 46 when the piston 42 is in the normal position and to afford communication between the cylinder 43 and the interior of the piston stem 39 when the piston 42 is moved by brake cylinder pressure in excess of that of the spring 45.

The compression of the spring 45 can be adjusted by a screwed plug 48, and in order to permit of readily adjusting the spring a portion of the cylinder 37 is cut away, the aperture being closed by a hinged plate 49. This arrangement is more particularly applicable to brake apparatus provided with a single brake cylinder only, and in practice the spring 45 is so adjusted as to permit of ordinary service applications of the brakes being made without moving the piston 42 so that only upon an excessive service application or an emergency application of the brakes is the pressure in the brake cylinder controlled by the release valve and the pulley 24 brought into contact with the axle of the vehicle.

Having now described my invention, what I claim as new and desire to secure by Letters Patent is:—

1. In a fluid pressure brake, the combination with an electro-magnetic device for controlling the brake cylinder pressure, of an electric generator driven by the momentum of the vehicle for varying the supply of current to said electro-magnetic device according to the speed of the vehicle and means for throwing said generator into action when the brakes are applied.

2. In a fluid pressure brake, the combination with a brake cylinder release valve, and electro-magnetic means for controlling the same, of an electric generator driven from the axle of the vehicle for varying the supply of current to said electro-magnetic means according to the speed and means for throwing said generator into action when the brakes are applied.

3. In a fluid pressure brake, the combination with a brake cylinder release valve, of an electric generator driven from the axle of the vehicle, and means operated by the varying current thus generated for controlling said valve and means for throwing said generator into action when the brakes are applied.

4. In a fluid pressure brake, the combination with an electric generator adapted to be driven from the vehicle axle for controlling the brake cylinder pressure, of means normally preventing the operation of said generator but causing same to operate when the brakes are applied.

5. In a fluid pressure brake, the combination with an electric generator adapted to be driven from the vehicle axle for controlling the brake cylinder pressure, of means normally preventing the operation of said generator and mechanism operated by brake cylinder pressure for causing said generator to generate current.

6. In a fluid pressure brake, the combination with an electric generator adapted to be driven from the vehicle axle for controlling the brake cylinder pressure, of a piston subject to brake cylinder pressure for throwing said generator into action and a spring for opposing the brake cylinder pressure upon the piston.

7. In a fluid pressure brake, the combination with an electric generator adapted to be driven from the vehicle axle, an electromagnetic device supplied with current from said generator, and a brake cylinder release valve operated thereby, of a piston operated by brake cylinder pressure for throwing said generator into action.

In testimony whereof I have hereunto set my hand.

WALTER PHILLIPS.

Witnesses:
 ALBERT CHINN,
 FRANK P. MOULDEN.